Aug. 23, 1955  P. LIEBER  2,715,951
VIBRATION DAMPERS
Filed July 12, 1950
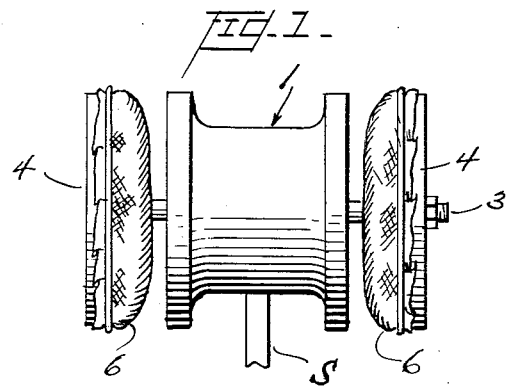
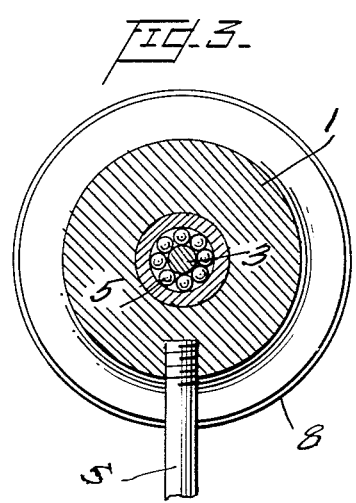
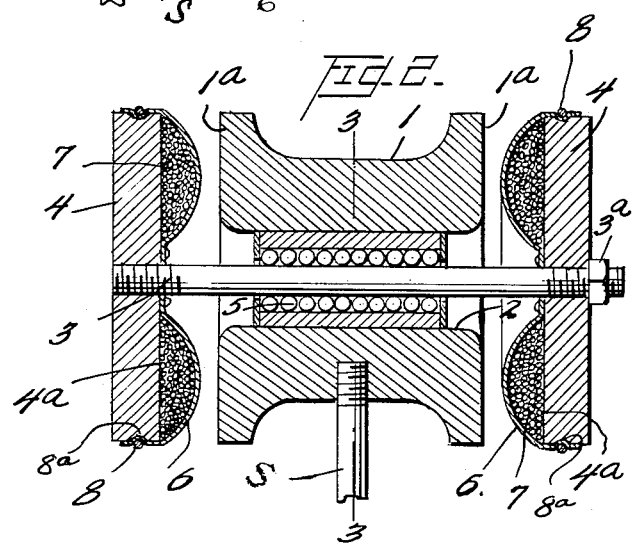
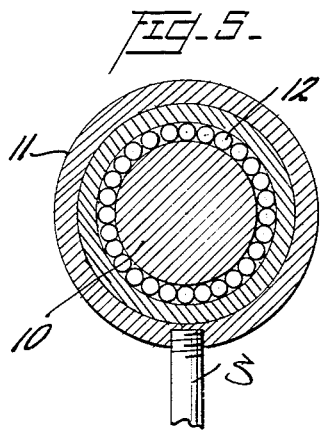
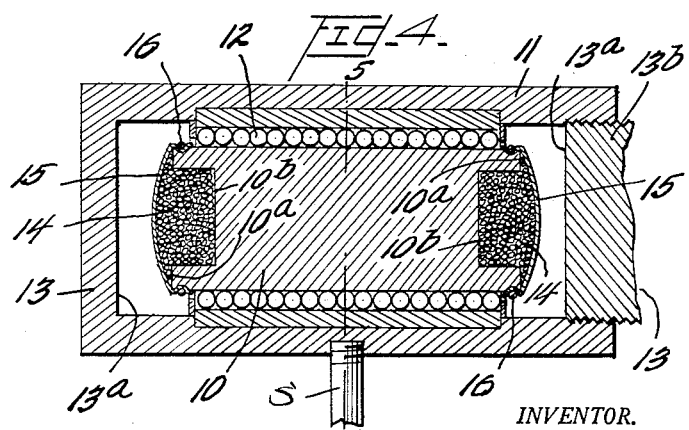
INVENTOR.
Paul Lieber
BY
Attorney

# United States Patent Office 2,715,951
Patented Aug. 23, 1955

2,715,951

VIBRATION DAMPERS

Paul Lieber, Flushing, N. Y.

Application July 12, 1950, Serial No. 173,333

2 Claims. (Cl. 188—1)

This invention relates to vibration dampers that operate upon the impact principle.

In this type of vibration damper a freely movable inertia member and an abutment member having a pair of abutments located at opposite sides of the inertia member are supported upon the structure whose vibrations are to be damped so that in consequence of the vibrations transmitted to the damper from the structure repeated impacts occur between the inertia member and the abutments. By cushioning and absorbing these impacts the kinetic energy of the inertia member is transformed into heat with an attendant damping of the vibrations in the structure. One form of this impact-type vibration damper is described in Patent No. 2,155,052 of Conrad Friedrich Byland, granted April 18, 1939.

While the principle of this type of vibration damper is essentially sound, the actual construction and operation of the device gives rise to a number of difficulties. In order to absorb the impact and dissipate energy between the inertia member and the abutments a solid, such as a soft metal, has been proposed. Not only are such dampers noisy in operation, but if the solid selected as the impact absorbing and energy dissipating medium, for example lead, is sufficiently soft to absorb the full impact between the abutments and the inertia member without imparting rebound to the inertia member, then the metal soon becomes so distorted as to impede the travel of the inertia member; or in any event the metal wears away so rapidly as to make frequent replacements necessary. Furthermore, an impact absorbing and energy dissipating material even of the degree of the malleability of soft lead is still too rigid to absorb light tapping blows or blows transmitted at very high frequency so that the device is unsuitable for use in the case of some classes of machinery and instruments. And because the impact absorbing and energy dissipating action of a solid is affected by changes in temperature, the efficiency of such a vibration damper consequently is variable.

It is an important object of the present invention to provide an impact-type vibration damper that overcomes the above objections by employing as the impact absorbing and energy dissipating member a cushioning pad composed of a flexible covering material containing a deformable, non-resilient aggregate mass of particles capable of yielding in the manner of a viscous liquid to completely absorb the impact of the inertia member without imparting any appreciable rebound thereto and to dissipate the heat generated by repeated impacts.

Another object of my invention is to provide an impact-type vibration damper of the above character in which the inertia member is mounted for reciprocation with a minimum amount of sliding friction so that an inertia member of maximum mass (depending upon the intended application of the damper) may be employed without producing an excessive amount of drag whereby the device is rendered sensitive to relatively small vibrations.

Still another object of the invention is to provide an impact-type vibration damper of the above character in which the abutment member is swingably mounted and the pad containing the cushioning medium is positioned between the impact faces of the inertia member and the companion impact faces of the abutment.

A further object of the invention is to provide an impact-type vibration damper of the above character in which the amplitude of travel between the inertia member and the abutments may be adjusted to produce maximum damping efficiency.

Other objects and advantages will be apparent from the following detailed description of a preferred embodiment of the invention, reference being made to the annexed drawings in which:

Figure 1 is a view in side elevation of an impact-type damper;

Figure 2 is an enlarged view in longitudinal cross-section of the damper of Figure 1;

Figure 3 is a view in transverse cross-section of the damper taken on the line 3—3 of Figure 2;

Figure 4 is a view in longitudinal cross-section of a modified form of vibration damper; and Figure 5 is a view in transverse cross-section taken on the line 5—5 of Figure 4.

In the vibration damper illustrated in Figures 1 through 3 the abutment member 1 comprises a generally-cylindrical spool-shaped body made of metal so as to impart substantial mass thereto. The abutment member is centrally apertured to provide an opening 2 extending throughout its length. Passing through and projecting beyond opposite ends of the abutment member is an inertia member comprising a cylindrical rod 3 having supported upon its opposite ends impact surfaces 4 in the form of plates that are commensurate in diameter with the end faces of the abutment member. One of the plates is threadedly adjustable upon an end of rod 3 and held by a nut 3a to vary the distance of relative travel of the abutment member and the rod. A ball-bearing assembly 5 is mounted intermediate the rod 3 and the inner circumference of the opening 2 to reduce sliding friction between the abutment member and the rod of the inertia member.

The ends 1a of the abutment member 1 and the companion opposing ends 4 of the inertia member are generally flat and disposed in parallel planes, and these ends constitute impact faces between the inertia member and the abutment member. Secured to the impact faces 4a of the inertia member are ring-shaped pads 6 made of a flexible and inelastic material, such as heavy rubberized duck, metal fabric, woven cord or the like, which is capable of withstanding a considerable amount of abrasion, or of wire-reinforced asbestos capable of withstanding high temperatures and abrasion. These pads are loosely filled with a non-resilient, deformable cushioning medium 7 that is not internally self-restoring to any appreciable degree. A cushioning medium that is especially satisfactory for this purpose comprises an aggregate mass of small non-coherent particles of heat-conductive metal or metal shot. Such particles or shot are not only capable of being readily displaced by impact within the confines of the pad but also are disintegrated to a certain extent by the impacts. They also conduct the heat generated within the non-coherent mass to the surfaces of the impact plates 4 where it is dissipated into the surrounding atmosphere. However, cushioning mediums that are not heat-conductive to any significant degree but which do not readily disintegrate under blows may be used as a filler for the pads. The pads are fastened to the impact faces 4a by means of contractible wire rings 8 lying within grooves 8a and clamping the edges of the pads to the circumferences of the impact plates.

The abutment member 1 is supported on a shaft S that may extend from a part of the structure (not shown)

producing the vibrations which are to be damped, or the shaft may constitute a part of the structure itself.

In the operation of the vibration damper just described, the shaft S is attached to the structure generating the vibrations that are to be damped in such a manner that the direction of the rod 3 extends parallel to the direction of propagation of the vibrations. The abutment member 1 upon picking up the vibrations from the shaft S will have reciprocating motion imparted to it along the rod 3. Periodic impact of the end faces 1a of the abutment member with the pads 6 located on the impact plates 4 of the inertia member causes displacement of the cushioning material therein without producing a substantial rebound, so that the abutment member is brought momentarily to rest every time it strikes a plate 4. The kinetic energy of the inertia member is given up as heat to the cushioning medium 7 filling the pads and this heat is conducted away by the surrounding air.

There are two principal ways in which the particles enclosed in the pad dissipate the vibration energy. One is by displacement and friction between the particles as they roll or slide over each other; and the other is by disintegration or breaking up of the particles into smaller fragments. In both these ways, by friction and by disintegration, the kinetic energy of the inertia member is dissipated, and the relative extent of the contributions of one or the other modes of energy dissipation depends mainly upon the medium of which the particles are composed. If, for example, the particles are of steel, the dissipation will be accomplished primarily by friction resulting from relative motion between the particles; whereas if the particles are composed of a softer metal, such as lead, a larger portion of the vibratory energy will be expended in breaking down the particles. Almost any particulate material can serve as the cushioning medium providing it lacks resiliency in the aggregate mass, is not readily affected by temperature and humidity and does not disintegrate under impact too rapidly.

The vibration damper may alternatively take the form shown in Figures 4 and 5. In this modification of the device, the inertia member 10 comprises a solid metal piston contained within a cylinder 11 of somewhat greater length than the inertia member. The inertia member is adapted to roll within a ball-bearing assembly 12 supported upon the inside of the cylinder, whereby relative back-and-forth travel between the inertia member and the cylinder takes place with a minimum amount of sliding friction. The cylinder 11, comprising an abutment member, is closed at its opposite ends to provide end walls 13 having impact faces 13a for arresting relative travel between the inertia member and the cylinder.

The ends 10a of the inertia member provide impact faces opposed to the impact faces 13a of the abutment member, and these faces 10a are recessed, as indicated at 10b, to provide spaces for accommodating a supply of cushioning material 14, similar to the cushioning material described in connection with the embodiment of the damper of Figures 1, 2, and 3. The impact faces of the inertia member are covered by pads 15 secured in place by wire clamping rings 16, the cushioning material loosely filling the pads and bulging them outwardly. One of the impact faces of the cylinder 11 comprises a stud 13b threaded into and closing an end of the cylinder, the arrangement being such that the stud may be screwed inwardly or outwardly of the cylinder to decrease or increase the path of travel of the inertia member. The cylinder is supported on a shaft S attached to or forming part of the vibrating structure that is to be damped.

While I have shown and described two forms of vibration devices with the cushioning pads secured to the impact faces of either the inertia member or the abutment member, it is not of primary importance whether these pads be placed on the inertia member or the abutment member, or even on both, so long as a pad is interposed between a pair of companion impact faces on the inertia and the abutment members.

The term "reciprocating movement" is used herein in a broad sense to include both rectilinear and curvilinear motion.

It is understood that the invention is not limited to the exact constructions of the preferred forms of vibration dampers illustrated and described above, but that modifications in design and structural details thereof may be made within the scope of the following claims.

I claim:

1. A vibration damper of the impact type comprising an abutment member composed of metal and having flat impact faces upon its opposite sides, an opening extending centrally through the abutment member, a rod passing through said opening and projecting substantially beyond opposite sides of the abutment member, impact plates supported upon opposite ends of said rod and presenting impact faces companion to the impact faces on the abutment member, said rod and impact plates constituting an inertia member, and a pad of non-resilient, deformable cushioning provided upon one of each pair of companion impact faces of the abutment member and the inertia member, said cushioning material comprising a mass of non-coherent particles enclosed within a flexible and inelastic covering.

2. A vibration damper of the impact type as set forth in claim 1 including an antifriction bearing intermediate the abutment member and the rod.

References Cited in the file of this patent

UNITED STATES PATENTS

| 2,029,796 | Saloman | Feb. 4, 1936 |
| 2,195,041 | Von Schlippe | Mar. 26, 1940 |
| 2,277,111 | Johnson | Mar. 24, 1942 |
| 2,302,670 | Buchanan | Nov. 24, 1942 |
| 2,451,217 | Heinrich | Oct. 12, 1948 |
| 2,466,327 | Rieber | Apr. 5, 1949 |
| 2,514,140 | O'Connor | July 4, 1950 |

FOREIGN PATENTS

| 148,964 | Great Britain | Sept. 15, 1921 |
| 393,398 | Great Britain | June 8, 1933 |